US011585788B2

(12) United States Patent
Feuilly et al.

(10) Patent No.: US 11,585,788 B2
(45) Date of Patent: Feb. 21, 2023

(54) METHOD FOR AUTOMATICALLY INSPECTING A WELD BEAD DEPOSITED IN A CHAMFER FORMED BETWEEN TWO METAL PIECES TO BE ASSEMBLED

(71) Applicant: SAIPEM S.A., Montigny le Bretonneux (FR)

(72) Inventors: Nicolas Feuilly, Viroflay (FR); Marco Aurelio Occhilupo, Turin (IT); Eric Kerdiles, Marcq (FR)

(73) Assignee: SAIPEM S.A, Montigny le Bretonneux (FR)

( * ) Notice: Subject to any disclaimer, the term of this patent is extended or adjusted under 35 U.S.C. 154(b) by 949 days.

(21) Appl. No.: 16/343,344

(22) PCT Filed: Oct. 10, 2017

(86) PCT No.: PCT/FR2017/052776
§ 371 (c)(1),
(2) Date: Apr. 18, 2019

(87) PCT Pub. No.: WO2018/073511
PCT Pub. Date: Apr. 26, 2018

(65) Prior Publication Data
US 2019/0242853 A1 Aug. 8, 2019

(30) Foreign Application Priority Data
Oct. 19, 2016 (FR) ........................ 1660151

(51) Int. Cl.
*G01N 29/04* (2006.01)
*B23K 31/12* (2006.01)
(Continued)

(52) U.S. Cl.
CPC ......... *G01N 29/041* (2013.01); *B23K 9/0216* (2013.01); *B23K 9/0286* (2013.01);
(Continued)

(58) Field of Classification Search
CPC .... G01N 29/041; G01N 29/11; G01N 29/225; G01N 29/228; G01N 29/2412;
(Continued)

(56) References Cited

U.S. PATENT DOCUMENTS 4,331,034 A * 5/1982 Takeda ................. G01N 29/265
73/637
4,588,873 A 5/1986 Fenn
(Continued)

FOREIGN PATENT DOCUMENTS

FR 3010526 3/2015
JP 62028662 A * 2/1987
(Continued)

*Primary Examiner* — Lisa M Caputo
*Assistant Examiner* — Rose M Miller
(74) *Attorney, Agent, or Firm* — Cozen O'Connor

(57) ABSTRACT

A method of automatically inspecting a weld bead deposited in a plurality of passes in a chamfer formed between two parts by performing the following steps: positioning at least one emission electromagnetic acoustic sensor on one side of the chamfer and at least one reception electromagnetic acoustic sensor on an opposite side of the chamfer, the ultrasound wave emission sensor being configured to emit Rayleigh surface waves; while depositing a pass, automatically moving the sensors to follow the movement of welding electrodes along the chamfer; activating the sensors while they are moving to enable the emission sensor to generate and emit Rayleigh waves towards the pass of the weld bead that is being deposited, the reception sensor receiving the ultrasound signals transmitted and/or reflected in said pass; and reiterating the operation for the entire pass of the weld bead.

14 Claims, 5 Drawing Sheets

(51) Int. Cl.
- *G01N 29/22* (2006.01)
- *G01N 29/24* (2006.01)
- *G01N 29/265* (2006.01)
- *B23K 9/02* (2006.01)
- *B23K 9/028* (2006.01)
- *G01N 29/11* (2006.01)
- *G01N 29/44* (2006.01)
- *G10K 11/35* (2006.01)

(52) U.S. Cl.
CPC ............ *B23K 31/125* (2013.01); *G01N 29/11* (2013.01); *G01N 29/225* (2013.01); *G01N 29/228* (2013.01); *G01N 29/2412* (2013.01); *G01N 29/265* (2013.01); *G01N 29/4427* (2013.01); *G01N 29/4445* (2013.01); *G10K 11/355* (2013.01); *G01N 2291/015* (2013.01); *G01N 2291/0234* (2013.01); *G01N 2291/048* (2013.01); *G01N 2291/0423* (2013.01); *G01N 2291/102* (2013.01); *G01N 2291/103* (2013.01); *G01N 2291/105* (2013.01); *G01N 2291/2634* (2013.01); *G01N 2291/2675* (2013.01)

(58) Field of Classification Search
CPC ............. G01N 29/265; G01N 29/4427; G01N 2291/015; G01N 2291/0234; G01N 2291/0423; G01N 2291/048; G01N 2291/102; G01N 2291/103; G01N 2291/105; G01N 2291/2634; G01N 2291/2675; B23K 9/0286; B23K 9/0216; G10K 11/355
USPC .......................................... 219/60 R; 73/643
See application file for complete search history.

(56) References Cited

U.S. PATENT DOCUMENTS

| | | | | |
|---|---|---|---|---|
| 5,777,229 | A | * | 7/1998 | Geier ................ G01N 29/2412 73/620 |
| 6,484,584 | B2 | * | 11/2002 | Johnson ............... B23K 31/125 73/624 |
| 7,278,315 | B1 | * | 10/2007 | Klein ................... G01N 29/221 73/598 |
| 2011/0296922 | A1 | * | 12/2011 | Ali ..................... G01N 29/2412 73/588 |

FOREIGN PATENT DOCUMENTS

| | | | | |
|---|---|---|---|---|
| JP | 01132962 A | * | 5/1989 | |
| WO | WO-2004007138 A1 | * | 1/2004 | ............ B23K 31/12 |
| WO | WO 2004/012895 | | 2/2004 | |
| WO | WO-2006068716 A1 | * | 6/2006 | ............ B23K 31/12 |

\* cited by examiner

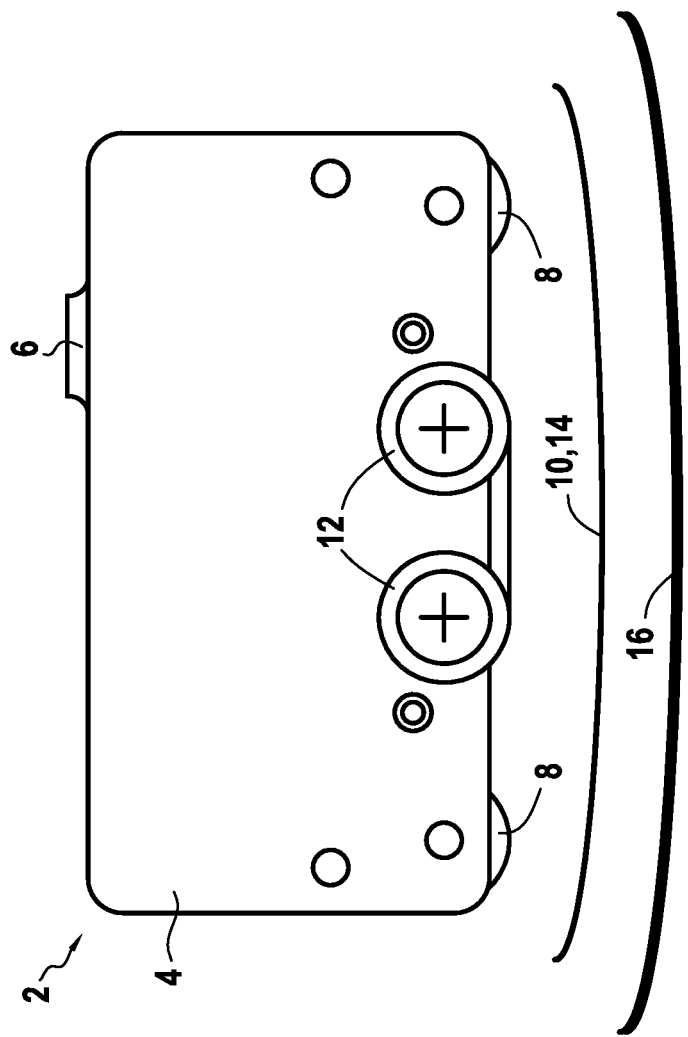
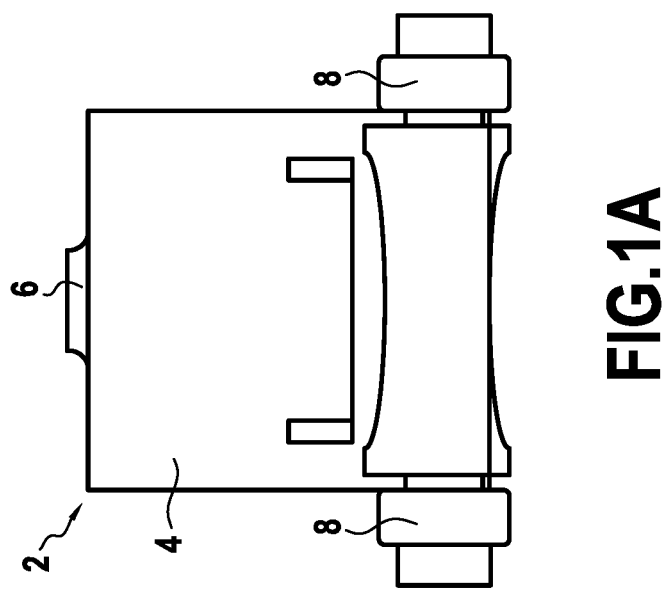

METHOD FOR AUTOMATICALLY INSPECTING A WELD BEAD DEPOSITED IN A CHAMFER FORMED BETWEEN TWO METAL PIECES TO BE ASSEMBLED

PRIORITY CLAIM

This is a U.S. national stage of application No. PCT/FR2017/052776, filed on Oct. 10, 2017. Priority is claimed on France Application No. FR1660151, filed Oct. 19, 2016, the content of which is incorporated here by reference.

BACKGROUND OF THE INVENTION

The present invention relates to the general field of nondestructive inspection of a weld bead deposited in a chamfer formed between two metal parts for assembling together.

A nonlimiting field of application of the invention is that of inspecting an annular weld bead deposited between two tubular pipes abutting end to end, in particular between two tubular elements of an undersea pipe for transporting hydrocarbons.

Nondestructive inspection techniques are used in particular in the oil industry to identify the presence of defects in a weld bead deposited between two tubular pipe elements in particular by arc welding, where such a defect may be a lack of melting, cracking, inclusions, or pores, and the techniques may possibly also be used to quantify such defects.

In the oil industry, radiography is one of the techniques presently in use for inspecting a weld bead deposited between two tubular pipe elements during stages of prefabricating the pipe on land or while the pipe is being S-laid or J-laid.

That technique is used in particular for inspecting butt welds of tubes that are internally lined with a layer of corrosion-resistant alloy (e.g. Inconel®). Typically, this alloy layer presents a thickness lying in the range 2.5 millimeters (mm) to 5 mm and it coats internally the inside surface of the carbon steel tube in order to improve its mechanical and chemical properties.

One of the techniques for coating the inside surface of carbon steel tubes with an anticorrosion alloy layer, and that is used mainly when the pipe is subjected to high levels of fatigue stress, consists in hot laminating the anticorrosion alloy layer onto a carbon steel sheet in order to obtain a metallurgical bond between the two materials. Another technique consists in building up the inside surface of a carbon steel tube with successive deposits of the anticorrosion alloy.

Nevertheless, the requirements for constructing pipes are becoming more and more constraining, in particular in terms of inspecting butt welds of internally lined tubes. In particular, in addition to final radiographic inspection of weld beads, those requirements impose intermediate radiographic inspection in order to ensure there are no defects in the weld in register with the lining. This affects productivity since inspection needs to take place in two stages. This results in a cycle time of that is lengthened by 15 minutes (min) to 20 min per weld, solely as a result of the requirement to perform an additional radiographic inspection.

Another technique used for inspecting butt welding in tubes that are internally lined with a layer of corrosion-resistant alloy consists in automated ultrasound testing (AUT). That technique makes use of a phased array of ultrasound probes, i.e. probes, each of which comprises an array of single-element ultrasound sensors used for inspection purposes. Such ultrasound sensors can both emit and receive ultrasound. They are generally piezoelectric sensors that convert an ultrasound wave into electricity, and vice versa.

Nevertheless, that technique presents the drawback of being suitable for use only once the weld has been finished and has cooled to a temperature lower than 90° C. Specifically, the piezoelectric effect of such sensors disappears above 200° C. Furthermore, since water is usually used to provide ultrasound coupling between the sensors and the surface of the part for inspection, it is difficult for the surface temperature of the part to exceed 100° C. Finally, the shoes associated with such sensors, and inside which ultrasound waves are generated, have mechanical characteristics that vary with temperature. That leads to variations in the speeds of the waves, thereby degrading the performance of the ultrasound inspection.

Document U.S. Pat. No. 4,588,873 discloses a method for real-time ultrasound inspection of a single-pass weld bead W deposited in a chamfer formed by two parts PI and PII. For that purpose, provision is made to have recourse to two acoustic sensors PRA, PRB for emitting and receiving bulk ultrasound waves, and that are positioned on either side of the chamfer. The bulk ultrasound waves (transverse or longitudinal) that are generated and received by those two sensors are sent in real time to a control device that serves to adjust certain welding parameters in order to correct defects appearing during the stage of welding.

Nevertheless, the inspection method as described in document U.S. Pat. No. 4,588,873 presents numerous drawbacks. Specifically, propagating ultrasound waves in the part for inspection requires a coupling fluid to be used between the sensor and the surface of the part. That coupling agent is in the form of a gel or of water (liquid). However, the coupling fluid can flow into the chamfer and give rise to defects (i.e. pores, cracking, . . . etc.) in the final weld bead. Because of the positioning of the sensors, the coupling fluid can have a negative impact on the microstructure of the weld bead (deteriorating mechanical properties such as hardness, elasticity, . . . ) by cooling it too quickly (quenching) during the real-time inspection. Furthermore, the use of conventional ultrasound probes limits inspection to temperatures higher than 100° C. Finally, conventional ultrasound sensors, such as those described in document U.S. Pat. No. 4,588,873, generate bulk ultrasound waves (in compression and/or shear) thereby being limited to operating in a "pulse-echo" mode during inspection. With that inspection technique, interpretation of the ultrasound signals is disturbed by the shape of the partially-filled chamfer. Furthermore, real-time inspection requires the penetration angle of the bulk waves to be modified in order to target and inspect in real time each successive bead of welding.

Still another technique used for inspecting butt welds consists in replacing piezoelectric sensors by electromagnetic acoustic transducers (EMAT) or sensors. The general principle for emitting ultrasound EMATs is as follows: a coil, carrying alternating current (AC) and placed in the proximity of the weld bead for inspection, induces currents therein that are distributed over its surface (eddy currents) in a zone where a permanent magnetic field has been established. Interaction between the permanent magnetic field and the eddy currents gives rise to electromagnetic and magnetostriction forces at the surface of the metal, in turn causing particles of the metal to move, thereby generating ultrasound waves that propagate directly in the material being inspected. Those ultrasound waves thus serve to reveal the existence of defects in the weld bead and to characterize such defects as a function of changes to which the ultrasound waves are subjected while they are propagating.

Thus, document WO 2004/007138 discloses the application of the EMAT principle for inspection of an annular weld bead deposited between two tubular elements. For this purpose, that document describes an inspection appliance that is mounted around the weld bead for inspection and that remains stationary relative thereto during the inspection operation proper, the appliance having two electromagnetic acoustic sensors positioned above and below the weld bead at a distance therefrom of 2 mm.

Nevertheless, the EMAT inspection method described in publication WO 2004/007138 presents numerous drawbacks. Specifically, since the inspection appliance is stationary relative to the weld bead, inspection can be undertaken only once the entire weld bead has been deposited in the chamfer between the two tubular elements. The inspection method described in that document emits transverse waves for inspecting the weld bead. However, using that type of wave does not make it possible to inspect the entire volume of a multi-pass weld. Furthermore, depending on the frequency of the transverse waves used, or depending on their angle of emission, it can happen that certain defects present in the weld bead, such as lack of melting or pores, are not detected, because of their small size, or because of their orientation in three-dimensional space.

OBJECT AND SUMMARY OF THE INVENTION

A main object of the present invention is thus to propose a method of inspecting a weld bead that does not present the above-mentioned drawbacks.

In accordance with the invention, this object is achieved by a method of automatically inspecting a weld bead deposited in a plurality of passes in a chamfer formed between two metal parts for assembling together, the various passes of the weld bead being deposited by means of welding electrodes moving along the chamfer, the method comprising the following steps:

positioning at least one emission electromagnetic acoustic sensor for emitting ultrasound waves on one side of the chamfer and at least one reception electromagnetic acoustic sensor for receiving ultrasound signals on an opposite side of the chamfer, the electromagnetic acoustic sensor for emitting ultrasound waves being configured to emit Rayleigh surface waves;

while depositing a weld bead pass by means of the welding electrodes, automatically moving the electromagnetic acoustic sensors to follow the movement of the welding electrodes along the chamfer;

activating the electromagnetic acoustic sensors while they are moving so as to enable the emission electromagnetic acoustic sensor to generate and emit Rayleigh surface waves towards the weld bead pass that is being deposited, the reception electromagnetic acoustic sensor receiving the ultrasound signals transmitted and/or reflected in said pass; and reiterating the operation for the entire pass of the weld bead.

The inspection method of the invention is remarkable in particular because it makes it possible to inspect the various passes of the weld bead while they are being deposited in the chamfer. Specifically, the electromagnetic acoustic transducer (EMAT) sensors are movable relative to the metal parts for assembling together (which remain stationary) and they move following the movement of the welding electrodes. Thus, it is possible, in real time, to detect the presence of defects, if any, in the various passes of the weld bead while they are being deposited.

The inspection method of the invention is also remarkable in that the electromagnetic acoustic sensors generate ultrasound waves directly in the part for inspection and they do not require the use of a shoe nor the use of a coupling fluid, thereby enabling ultrasound inspection to be performed on a part having surface temperatures that may be as high as at least 310° C.

The inspection method of the invention is also remarkable in that the electromagnetic acoustic sensors for emitting ultrasound waves are configured to emit Rayleigh surface waves, i.e. surface waves combining both longitudinal and transverse modes in order to create elliptical orbital motion that, on propagating, follows the surface of the material for inspection. The advantage of waves of this type, combined with real-time inspection while depositing each pass of the weld bead, is that it serves to reveal all of the potential welding defects that might be present in the entire volume of each pass, and thus in the end throughout the entire thickness of the weld bead made up of a set of successive passes. The data making up the ultrasound signal, such as the travel time of the ultrasound wave, and also the energy levels transmitted and reflected by the wave and the resulting waves, and also their frequencies, is used to detect and characterize indications that might be present in the weld being inspected.

The inspection method of the invention presents numerous advantages compared with the technique of inspection by radiography. Specifically, this method makes it possible to be unaffected by problems of providing protection against X-rays and to eliminate safety and environmental risks. Compared with conventional inspection techniques using a radiography or ultrasound, the time required for inspecting a weld is also reduced considerably, which constitutes a major advantage in the oil industry for assembling tubular pipe elements for transporting hydrocarbons. Furthermore, the method can be performed at high temperature, which means there is no need to wait for the weld bead to cool down in order to inspect it. Also, inspection is performed in real time during the deposition of the various passes of the weld bead, thereby reducing cycle time considerably and serving to improve the productivity of the welding and inspection steps. Furthermore, the method of the invention is particularly well adapted to inspecting annular weld beads deposited between two lined tubes.

Preferably, on the electromagnetic acoustic sensor receiving ultrasound signals characteristic of a defect in the pass that is being deposited, the method further comprises causing certain welding parameters to be modified during the pass in order to correct said defect.

Under such circumstances, the modification of certain welding parameters during the pass may be performed by an operator.

Alternatively, the modification of certain welding parameters during the pass is advantageously performed automatically by machine learning classes and examples of welding defects.

This characteristic is thus remarkable in that it makes it possible advantageously and in real time to adapt the welding parameters (speed of advance of the weld feedwire, speed of advance of the welding torch(es), their positions, their oscillation, the current and the voltage necessary for striking the welding arc, etc.) as a function of the received ultrasound signals. A closed-loop control method for the welding and inspection operations is envisaged that makes use of machine learning. By using an automatically updatable data library made up of imperfections observed in previous welds, the ultrasound signals picked up by the inspection method of the invention are advantageously processed in such a manner as to adapt the welding parameters automatically so as to correct the presence of an imperfection and facilitate decision taking by the operator in order to carry out any corrective action.

Also preferably, the Rayleigh surface waves generated by the electromagnetic acoustic sensor for emitting ultrasound waves are waves emitted at a frequency lying in the range 200 kilohertz (kHz) to 4.5 megahertz (MHz). Such a frequency corresponds to emitting surface waves of the Rayleigh wave type.

Also preferably, the steps of the method are repeated for each pass of the weld bead deposited in the chamfer. It is thus possible to detect the presence of any defects throughout the thickness of the weld bead, and not only in the most recent pass.

Also preferably, the electromagnetic acoustic sensors are maintained permanently in contact with a surface of one of the two parts for assembling together so as to avoid any loss of signal during the inspection.

In an application example, the parts for assembling together are abutting tubular pipes, the chamfer being annular in shape.

In this application example, throughout the duration of the inspection, the method may advantageously further comprise acquiring the angular position of the electromagnetic acoustic sensors relative to the axis of revolution of the chamfer in order to determine the circumferential location of any defect in the pass of the weld bead that is being deposited.

Under such circumstances, the angular position of the electromagnetic acoustic sensors may be acquired by means of a rotary encoder coupled to a movable carriage carrying the electromagnetic acoustic sensors.

The movable carriage carrying the electromagnetic acoustic sensors may thus be connected to a carriage carrying the welding electrodes in order to move together therewith while depositing a weld bead pass.

Furthermore, the movable carriage carrying the electromagnetic acoustic sensors may move in a circumferential direction around the axis of revolution of the chamfer along an annular guide strip positioned on one of the tubular pipes, in particular by means of an electric motor, while being suitable for being held stationary in any angular position.

The electromagnetic acoustic sensors may comprise an electromagnetic acoustic sensor for receiving ultrasound signals and an electromagnetic acoustic sensor for emitting ultrasound waves positioned on one side of the chamfer, and another electromagnetic acoustic sensor for receiving ultrasound signals positioned on the opposite side of the chamfer.

Alternatively, the electromagnetic acoustic sensors may comprise an electromagnetic acoustic sensor for receiving ultrasound signals and an electromagnetic acoustic sensor for emitting ultrasound waves positioned on one side of the chamfer, and another electromagnetic acoustic sensor for receiving ultrasound signals and another electromagnetic acoustic sensor for emitting ultrasound waves, both positioned on the opposite side of the chamfer.

BRIEF DESCRIPTION OF THE DRAWINGS

Other characteristics and advantages of the present invention appear from the following description made with reference to the accompanying drawings, which show an implementation having no limiting character. In the figures:

FIGS. 1A and 1B show an example of an electromagnetic acoustic sensor used for performing the inspection method of the invention, seen respectively in end view and in side view;

DETAILED DESCRIPTION OF THE INVENTION

Figure 2A:
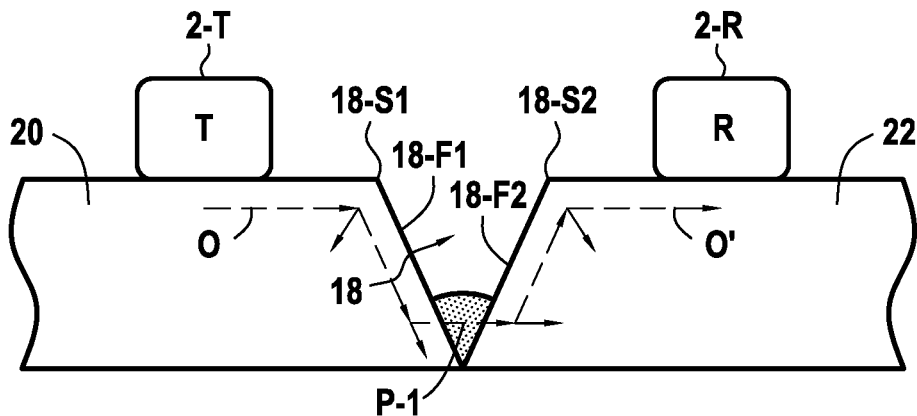
FIGS. 2A to 2C show the propagation of surface waves used by the inspection method of the invention while depositing respectively the first pass, an intermediate pass, and the last pass of a weld bead in a V-shaped chamfer.

The invention applies to nondestructive inspection of any weld bead deposited in one or more passes in a chamfer (e.g. of V-shape or J-shape) formed between the two metal parts for assembling together. Inspection serves to reveal the presence of defects in the weld bead, which defects may in particular be cracks, inclusions, pores, or lack of melting.

A nonlimiting field of application of the invention is that of inspecting an annular weld bead deposited by electric arc welding in one or more passes in a chamfer formed between two abutting tubular elements in order to form an undersea pipe for use in transporting hydrocarbons. By way of example, the tubular elements may be tubes internally lined with a layer of corrosion-resistant alloy.

Naturally, and in more general manner, the method of the invention is applicable to inspecting other types of weld bead deposited in one or more passes in a chamfer, and in particular to weld beads that are rectilinear.

The inspection method of the invention makes use of electromagnetic acoustic sensors for emitting and receiving ultrasound waves. These electromagnetic acoustic sensors are also referred to as electromagnetic acoustic transducers (EMATs).

FIGS. 1A and 1B show an example of such an EMAT sensor 2 used for performing the inspection method of the invention, as seen respectively in end view and in side view.

As shown in the figures, the EMAT sensor 2 is positioned inside a box 4 of substantially rectangular shape. On its top surface, the box 4 has a connector 6 for connecting to a power supply system and to a data acquisition and processor unit that makes use of automatic training, which is itself connected to the welding system that may possibly be self-adapting (unit and system not shown in the figures). On its bottom surface, the box has wheels 8 for enabling the sensor to move over the surfaces of parts for assembling together and for providing permanent contact with those surfaces in order to avoid any loss of signal during inspection.

The EMAT sensor 2 proper is made up of a flat coil 10 that is placed on the bottom surface of the box 4 and by means of rollers 12 that is held flat against the surfaces of the parts for assembling together. The EMAT sensor also has an electromagnetic coil 14 and a protective film 16.

Such an EMAT sensor operates as follows: the flat coil 10, carrying AC and placed in the proximity of the weld bead for inspection, induces eddy currents therein, which eddy currents are distributed at its surface in a zone where a permanent magnetic field has been established by means of the electromagnetic coil 14. The interaction between the permanent magnetic field and the eddy currents gives rise to electromagnetic and magnetostriction forces at the surface of the metal, in turn causing particles to move, thereby generating ultrasound waves that propagate in the metal. These ultrasound waves thus serve to reveal the existence of defects in the weld bead as a function of changes to which the ultrasound waves are subjected while they are propagating.

Figure 2B:
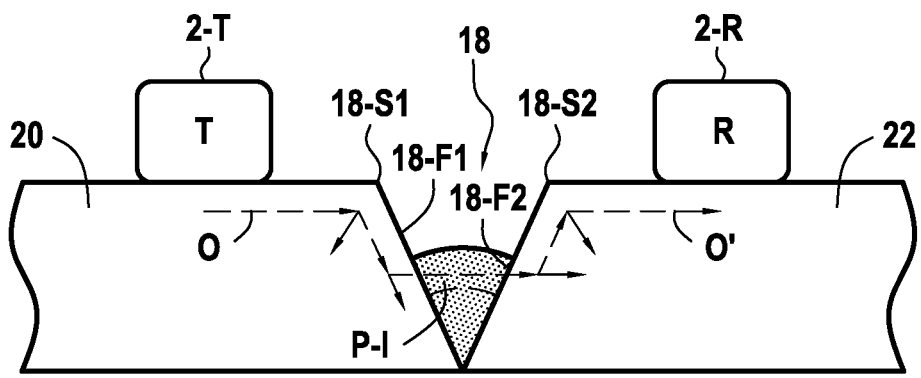
Figure 2C:
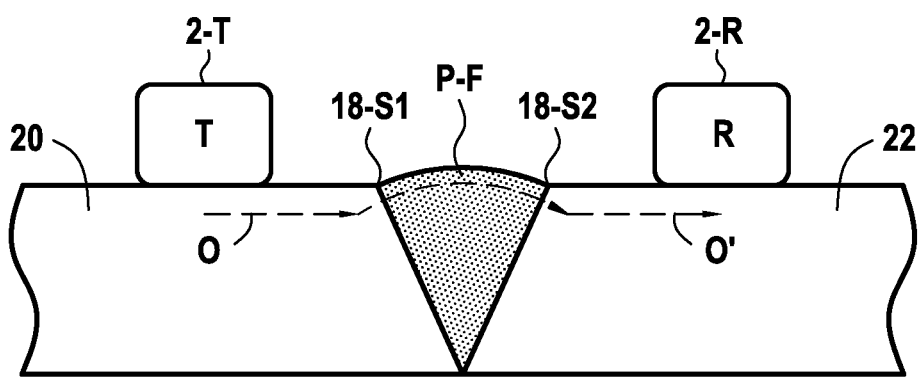

An EMAT sensor 2 can operate to emit or to receive ultrasound waves. In FIGS. 2A to 2C, the EMAT sensors for emitting ultrasound waves into the material of the weld bead for examination are given the reference 2-T, while the EMAT sensors for receiving the ultrasound signals as transmitted and/or reflected by the material of the weld bead are given the reference 2-R.

In the invention, the EMAT sensors 2-T are configured to emit ultrasound surface waves of the Rayleigh surface wave type, i.e. surface waves combining both longitudinal and transverse modes in order to create elliptical orbital motion that, on propagating, follows the surface of the material for inspection.

The penetration depth into the material for inspection of these Rayleigh waves is correlated directly with the pitch of the flat coil 10 of the EMAT sensor 2-T and with the frequency of the emitted waves. Typically, an ultrasound wave emission frequency is used that lies in the range 200 kHz to 4.5 MHz.

Using EMAT sensors 2-T, 2-R as described above, the inspection method of the invention provides for positioning of the sensors on either side of a chamfer formed between the two parts that are to be assembled together, with at least one EMAT sensor 2-T placed on one side of the chamfer and at least one EMAT sensor 2-R placed on the other side (i.e. the opposite side) of the chamfer.

FIG. 2A is a diagram showing an example of positioning the EMAT sensors 2-T, 2-R on either side of a chamfer 18 (specifically a V-shaped chamfer) that is formed between two parts 20 and 22 for assembling together. More precisely, in this example, a single EMAT sensor 2-T for emitting ultrasound waves and a single EMAT sensor 2-R for receiving ultrasound signals are positioned on opposite sides of the chamfer 18.

Once the EMAT sensors 2-T, 2-R are in position on either side of a chamfer formed between the two parts for assembling together, the inspection method of the invention makes provision, while using the welding electrodes to deposit a weld bead pass in the chamfer, to move the EMAT sensors automatically following the movement of the welding electrodes along the chamfer, while activating the EMAT sensors as they move so as to enable the emission EMAT sensor 2-T to generate and emit Rayleigh waves towards the weld bead pass that is being deposited, with the reception EMAT sensor 2-R receiving the ultrasound signals as transmitted and/or reflected through said pass. This operation is repeated for the entire pass of the weld bead, and then for all of the passes deposited in the chamfer.

In this inspection method, FIG. 2A shows likewise the propagation of ultrasound waves O emitted by the EMAT sensor 2-T and received by the EMAT sensor 2-R while the first pass P-1 of a weld bead is being deposited in the chamfer 18.

As shown in FIG. 2A, when the ultrasound wave also emitted by the EMAT sensor 2-T needs the top corner 18-S1 of the chamfer 18, a reflected surface wave propagates, but the majority of the energy continues to follow the face 18-F1 of the chamfer until it reaches the first pass P-1 of the weld bead, which it passes right through before rising along the other face 18-F2 of the chamfer towards the opposite top corner 18-S1 of the chamfer in order to reach the EMAT sensor 2-R.

The ultrasound wave O' that reaches the EMAT sensor 2-R for receiving ultrasound signals possesses less energy than the emitted wave O. When a defect is present in the first pass P-1, this defect leads to the ultrasound wave O that is passing through the first pass being reflected and dispersed, such that detection of this defect is correlated directly with the quantity of energy in the ultrasound signal received by the EMAT sensor 2-R. Both characterizing and dimensioning the defect are correlated with the dataset constituting the received ultrasound signal: travel time of the ultrasound wave, quantity of energy received, frequency, . . . etc.

FIG. 2B shows likewise the propagation of ultrasound waves O emitted and received by the EMAT sensors 2-T, 2-R while an intermediate pass P-I of the weld bead is being deposited in the chamfer 18.

The propagation of the waves O emitted by the EMAT sensor 2-T for emitting ultrasound waves is similar to the propagation described with reference to FIG. 2A: the energy of the wave O propagates essentially along with the top portion of the face 18-F1 of the chamfer 18, and passes through the intermediate pass P-I, before rising along the top portion of the other face 18-F2 of the chamfer and finally reaching the EMAT sensor 2-R. In this situation likewise, any defect in the intermediate pass P-I is detected as a function of the quantity of energy transmitted by the wave O' and received by the EMAT sensor 2-R. Both characterizing and dimensioning the defect are correlated with the dataset constituting the received ultrasound signal: travel time of the ultrasound wave, quantity of energy received, frequency, . . . etc.

FIG. 2C shows once more the propagation of the ultrasound waves O as emitted and received by the EMAT sensors 2-T, 2-R while depositing the last (or final) pass P-F of the weld bead.

The wave O emitted by the EMAT sensor 2-T for emitting ultrasound waves propagates as follows: the energy of the wave O propagates essentially directly from a top corner 18-S1 of the chamfer 18 towards the opposite corner 18-S2 by passing through the final pass P-F of the weld bead. Any defect in this final pass P-F is detected as a function of the quantity of energy transmitted by the wave O' and received by the EMAT sensor 2-R. Both characterizing and dimensioning the defect are correlated with the dataset constituting the received ultrasound signal: travel time of the ultrasound wave, quantity of energy received, frequency, . . . etc.

From the above, it can easily be understood that the inspection method of the invention enable the weld bead to be inspected for each of its passes. In particular, inspection is not limited merely to the final pass P-F, but applies to all of the passes deposited in the chamfer in order to form the weld bead. The invention thus makes it possible to detect and to dimension with the same accuracy any defect that might be present in any of the successive passes of the weld bead, from the first pass P-1 to the final pass P-F.

Furthermore, the advantage of this inspection method is that the axial position of the EMAT sensors 2-T, 2-R does not need to be modified in order to inspect all of the passes that are deposited to form the weld bead.

As described above, the inspection method of the invention requires at least one EMAT sensor 2-T for emitting ultrasound waves to be positioned on one side of the chamfer, and at least one EMAT sensor 2-R for receiving ultrasound waves to be positioned on the opposite side of the chamfer.

Various other configurations shown diagrammatically in FIGS. 3A to 3D can thus be envisaged for performing the inspection method of the invention.

Figure 3A:
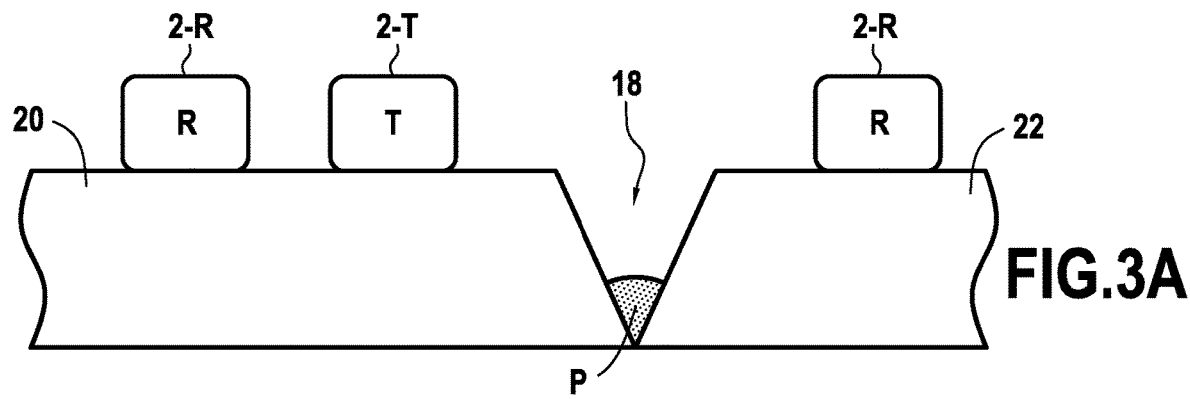
FIGS. 3A to 3D show diagrammatically various configurations for electromagnetic acoustic sensors for performing the inspection method of the invention.

Thus, the configuration of FIG. 3A provides for positioning an EMAT sensor 2-R for receiving ultrasound signals and an EMAT sensor 2-T for transmitting ultrasound signals on one side of the chamfer 18 formed between the two parts 20 and 22 for assembling together, and for positioning another EMAT sensor 2-R for receiving ultrasound signals on the opposite side of the chamfer (2-R/2-T/2-R configuration).

Figure 3B:
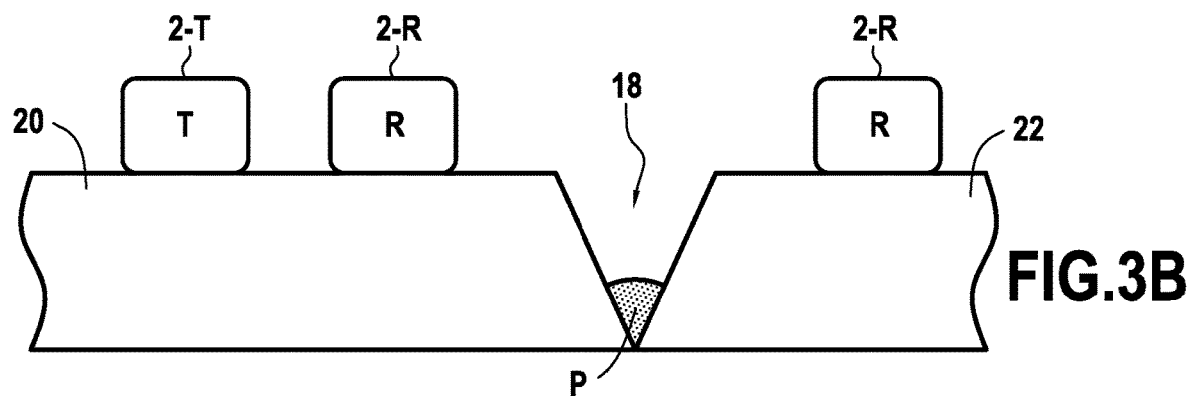

The configuration of FIG. 3B is similar to the configuration of FIG. 3A in terms of the number of EMAT sensors for receiving and emitting ultrasound waves (namely a reception EMAT sensor 2-R and an emission EMAT sensor 2-T on one side of the chamfer 18, and a single reception EMAT sensor 2-R on the other side of the chamfer), with the order in which the EMAT sensors 2-T and 2-R are positioned on the same side of the chamfer being reversed (2-T/2-R/2-R configuration).

Figure 3C:
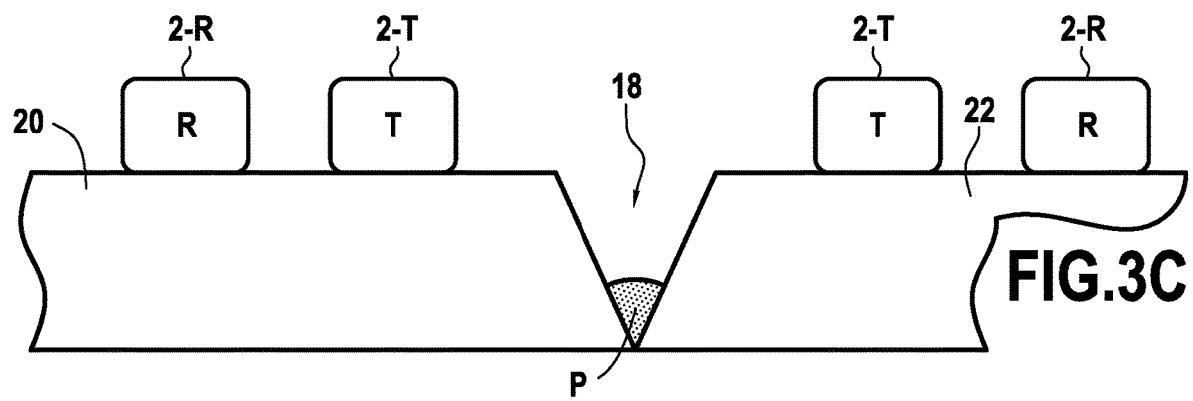

The configuration shown in FIG. 3C shows one EMAT sensor 2-R for receiving ultrasound signals and one EMAT sensor 2-T for emitting ultrasound signals positioned on one side of the chamfer 18 formed between the two parts 20 and 22 for assembling together, and another EMAT sensor 2-T for emitting ultrasound waves and another EMAT sensor 2-R for receiving ultrasound waves positioned on the opposite side of the chamfer (2-R/2-T/2-T/2-R configuration).

Figure 3D:
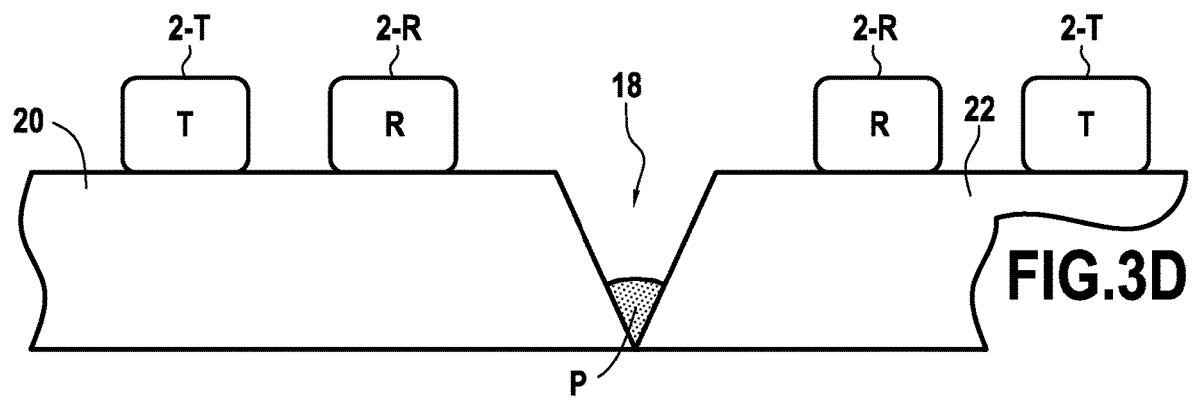

Finally, the configuration of FIG. 3D is close to that of FIG. 3C, having the same number of EMAT sensors on either side of the chamfer, but with the order in which they are positioned on either side of the chamfer being reversed (2-T/2-R/2-R/2-T configuration).

Figure 4:
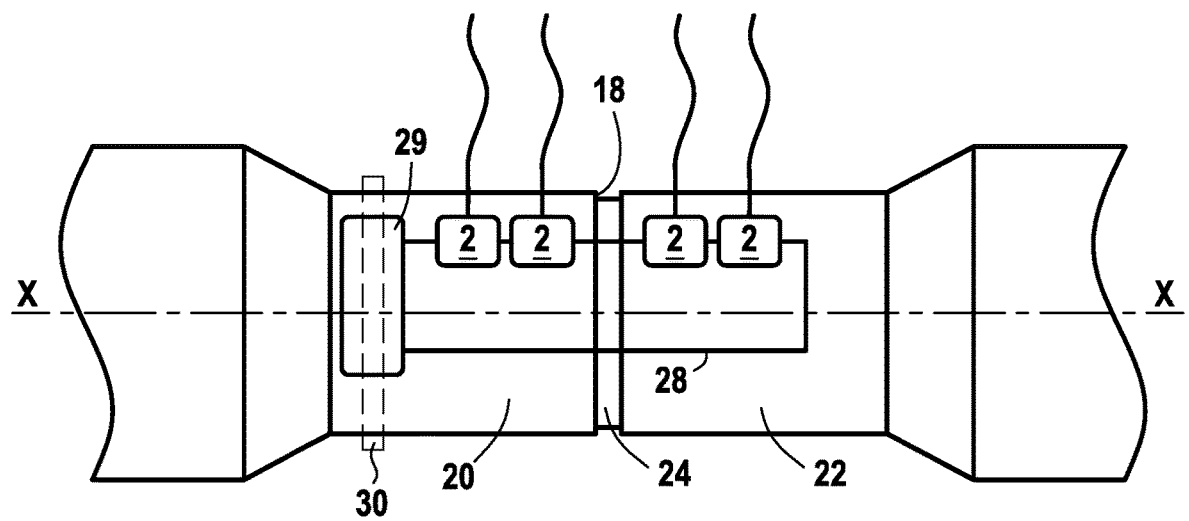
FIGS. 4 and 5 show diagrammatically, respectively a plan view and a side view of an implementation of the method of the invention when inspecting an annular weld bead deposited between two abutting tubular pipes.
Figure 5:
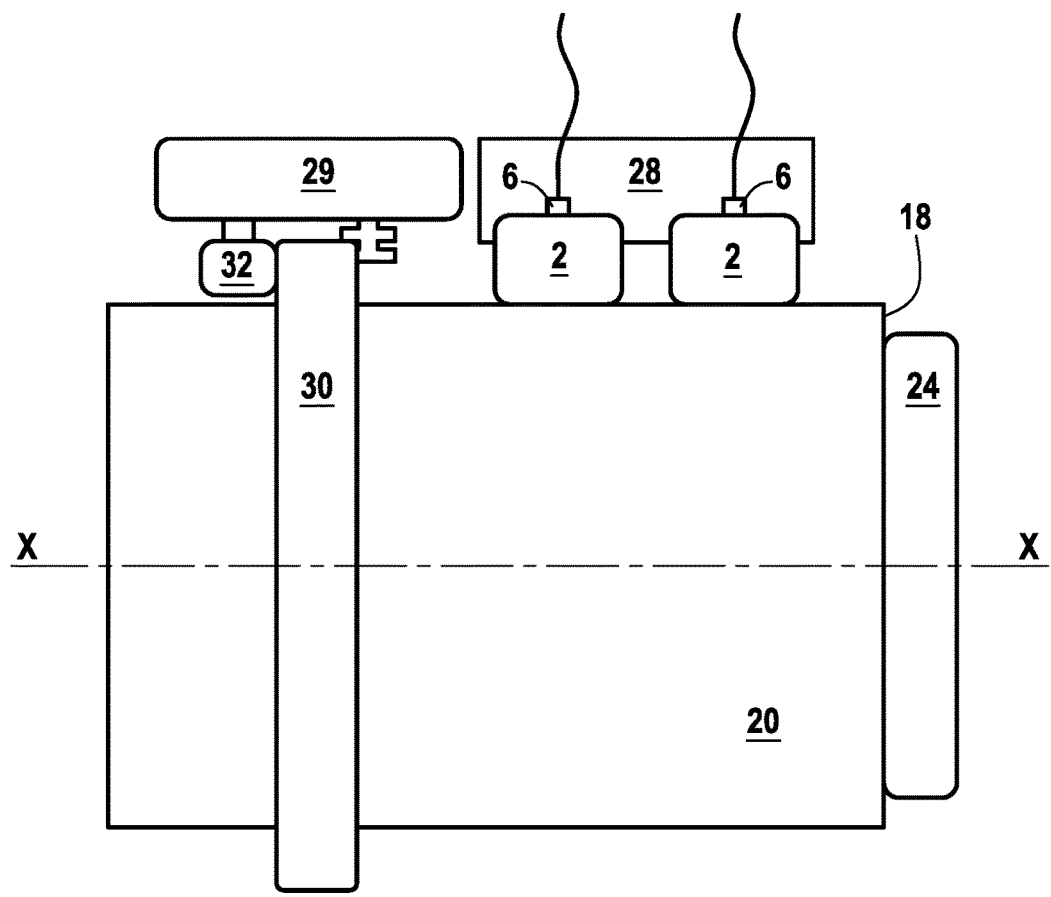

With reference to FIGS. 4 and 5, there follows a description of an implementation of the method of the invention to inspecting an annular weld bead 24 deposited in a plurality of passes in a chamfer 18 (which is likewise annular) formed between two abutting tubular pipes 20 and 22.

In this implementation, the method makes use of four EMAT sensors 2 arranged relative to the weld bead in one or the other of the configurations of FIG. 3C or 3D.

More precisely, the EMAT sensors 2 are carried by a carriage 28 that is movable relative to the pipes 20, 22 (and thus relative to the weld bead 24).

More precisely, the carriage 28 carrying the EMAT sensors moves automatically along a circumferential direction (relative to the axis of revolution X-X of the chamfer 18) following the movement of a carriage carrying the arc welding electrodes (not shown in the figures) so as to inspect the pass that is being deposited in the chamfer.

As the arc welding electrodes move circumferentially around the chamfer in order to deposit a weld bead pass, the EMAT sensors for emitting ultrasound waves emit ultrasound waves towards the portion of the weld pass that has just been deposited, and the EMAT sensors for receiving ultrasound signals receive the ultrasound signals that have been transmitted and/or reflected in said pass portion. Thus, it is possible to perform real-time inspection of each pass of the weld bead 24 while it is being deposited and to detect and dimension in real time any defects that might be present in the passes.

The carriage 28 carrying the EMAT sensors is moved by means of an electric motor 29 in a manner that is automatic and synchronized with the moving carriage carrying the arc welding electrodes so as to follow its circumferential movement.

Furthermore, it should be observed that the carriage 28 carrying the EMAT sensors moves in a circumferential direction around the axis of revolution X-X of the chamfer along an annular guide strip 30, which is positioned on one of the tubular pipes (specifically the pipe 20).

The presence of this guide strip 30 serves to maintain perfect alignment of the EMAT sensors relative to the chamfer 18. The guide strip also serves to hold the carriage 28 (and thus the EMAT sensors 2) in any angular position about the axis X-X.

Furthermore, the carriage 28 carrying the EMAT sensors is advantageously coupled to a rotary encoder 32 so as to obtain the angular position of the EMAT sensors relative to the axis of revolution X-X of the chamfer. Acquiring this data makes it possible to determine the accurate circumferential location of a defect detected in the pass of the weld bead that is being deposited.

Figure 6:
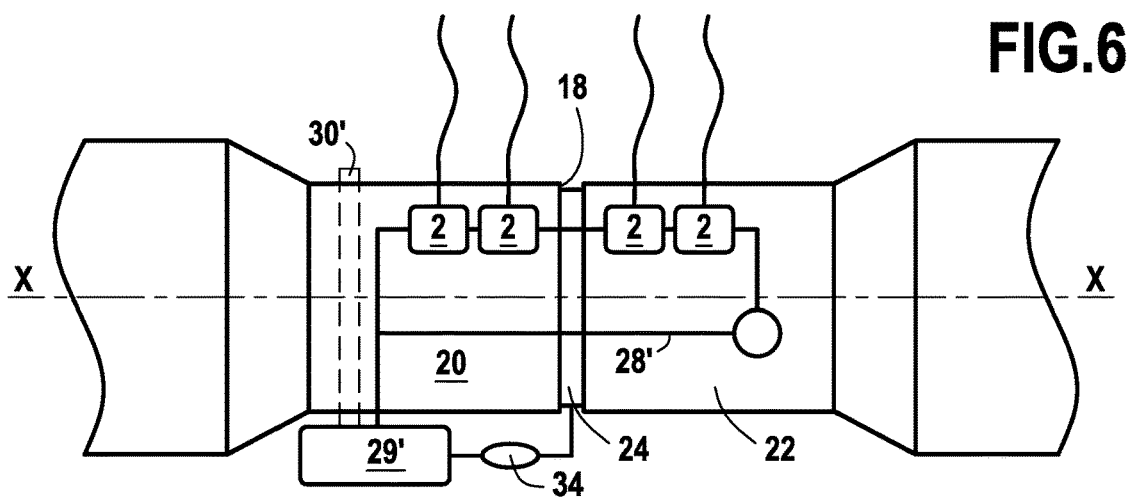
FIG. 6 shows diagrammatically a plan view of a variant of the implementation of FIGS. 4 and 5.

FIG. 6 shows a variant implementation of the method of the invention for inspecting an annular weld bead 24 deposited in a plurality of passes in a chamfer 18 formed between two abutting tubular pipes 20 and 22.

In this variant implementation, the method may use four EMAT sensors 2 (arranged relative to the weld bead in one or the other of the configurations of FIG. 3C or 3D) that are carried by a carriage 28' that is movable relative to the pipes 20 and 22.

Compared with the embodiment shown in FIGS. 4 and 5, this carriage 28' also carries the arc welding electrodes 34. More precisely, the EMAT sensors 2 are arranged upstream relative to the arc welding electrodes 34 (in the circumferential travel direction of the carriage 28').

The carriage 28' travels automatically by means of an electric motor 29' along a circumferential direction relative to the axis of revolution X-X of the chamfer 18 so as to enable firstly the arc welding electrodes to deposit a weld bead pass in the chamfer, and secondly the EMAT sensors to inspect the pass that is being deposited in real time.

In this variant implementation, the EMAT sensors travel with the arc welding electrodes and they necessarily have the same travel speed as the electrodes (and they maintain the same angular distance relative thereto).

As the carriage 28' move circumferentially, the arc welding electrodes 34 deposit a weld bead pass in the chamfer, and in parallel the EMAT sensors for emitting ultrasound waves emit ultrasound waves towards the portion of the weld pass that has just been deposited, while the EMAT sensors for receiving ultrasound signals receive the ultrasound signals that have been transmitted and/or reflected in said pass portion. It is thus possible to perform real-time inspection of each pass of the weld bead while it is being deposited and to detect and dimension in real time any defects that might be present in the passes deposited in succession in the chamfer.

In this variant, it should be observed that the carriage 28' moves in a circumferential direction around the axis of revolution X-X of the chamfer along an annular guide strip 30', which is positioned on one of the tubular pipes (specifically the pipe 20).

Whatever the implementation, the inspection method of the invention advantageously makes provision for various different actions in the event of detecting a defect in a weld bead pass that is being deposited.

Specifically, having recourse to Rayleigh type surface waves makes it possible to detect various different defects in a weld bead pass, and in particular: a lack of penetration, a lack of melting on the chamfer or between the different passes, cracks, and pores.

Furthermore, the characteristics of the detected defects, specifically the type of the defect and its dimensions, can be obtained in known manner by analyzing the ultrasound signals received by the EMAT sensors for receiving ultrasound signals.

Figure 7:
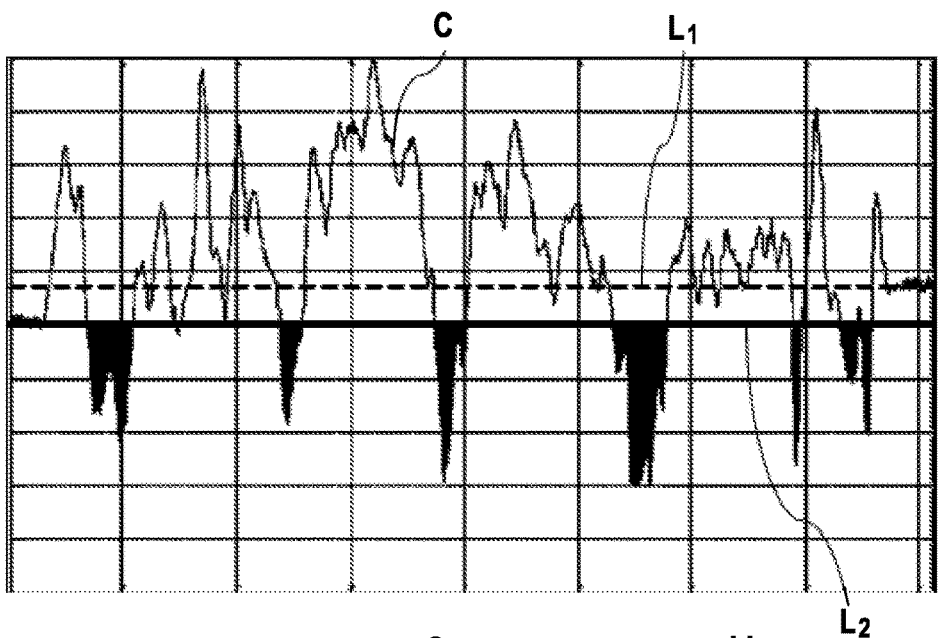
FIGS. 7 and 8 are curves showing a possible representation of the ultrasound signal received by the EMAT sensors used in the inspection method of the invention.
Figure 8:
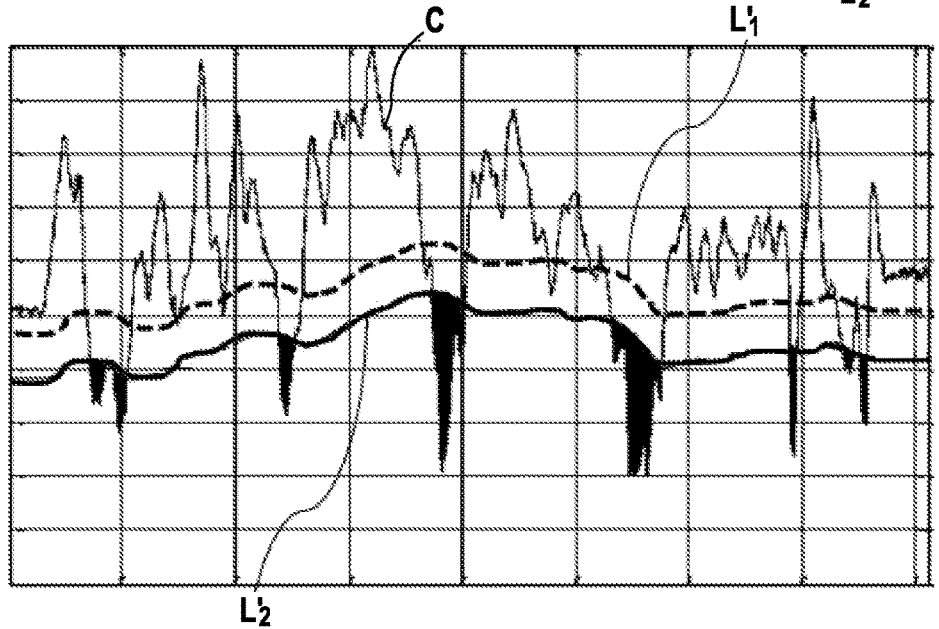

FIGS. 7 and 8 show respective example representations of ultrasound signals received by the EMAT sensors for receiving ultrasound signals while performing the above-described inspection method when applied to a weld bead deposited in a plurality of passes in an annular chamfer formed between two abutting tubular pipes.

These figures show a curve C that is a representation of the level of energy (in decibels (dB) or as an energy ratio) of those ultrasound signals received by the reception EMAT sensors relative to the circumferential position of the EMAT sensor around the axis of revolution of the annular chamfer.

In FIG. 7, two energy threshold level lines are also shown, namely a low threshold line $L_1$ and a high threshold line $L_2$. When the curve C passes under the low threshold line $L_1$, the operator the welding system receives a warning signal indicating that a defect is being created in the welding pass that is being deposited. When the curve C passes under the high threshold line $L_2$ (as applies to the dark portions in FIG. 7), the operator of the system receives another signal from which it can be concluded that the EMAT sensors have detected an anomaly and that a defect has been created in the welding pass that is being deposited. These threshold level lines $L_1$, $L_2$ can be obtained as a result of experience or by simulation, and they may be adapted using the principle of machine learning, which can be applied to processing the ultrasound signals that are picked up.

In FIG. 8, two other energy threshold level lines are also shown, namely a low threshold line $L'_1$ and a high threshold line $L'_2$. Compared with FIG. 7, these threshold lines are not rectilinear, but rather they are curved, since they follow and adapt to fluctuations in the curve C, in addition to self-adapting to data obtained as a result of experience or by simulation on the principle of machine learning that is applicable to the ultrasound signals as picked up.

When the curve C passes under the low threshold level line $L'_1$, the operator or the welding system is warned by a warning signal that a defect is being formed in the pass that is being deposited. When the curve C exceeds the high threshold level line $L'_2$, the operator of the welding system concludes that the EMAT sensors have detected an anomaly and that a defect has been created in the welding pass that is being deposited. These threshold level lines $L'_1$, $L'_2$ may be obtained by experience or by simulation.

When going (downwards) past the energy threshold level line $L_1$, $L_2$ (in FIG. 7) or $L'_1$, $L'_2$ (in FIG. 8), the operator or the welding system receives a warning message automatically. This warning message can then trigger (either automatically, or else via the operator) an appropriate modification to certain welding parameters in order to correct in real time the drop in the energy level of the curve C, thereby remedying the corresponding defect in the pass that is being deposited. For example, continued reception of half of the energy emitted by an EMAT probe might potentially be representative of a lack-of-melting defect, associated with an inappropriate speed or oscillation of the welding electrode.

This real-time modification (whether automatic, or by means of the operator) of certain parameters of the welding method may comprise modifications to the following parameters: amperage (current) and voltage of the electric arc, welding speed, oscillation (i.e. positioning) of the welding electrode, and the flow rate of inert gas that is injected to create a protective halo. This modification can thus make it possible to remedy the defect that is detected during inspection by modifying the welding parameters that are associated with creating such a defect.

Alternatively, when a warning message is sent to the operator or to the welding system to indicate that the high energy threshold level line $L_2$ or $L'_2$ has been exceeded downwards, the welding operation may equally well be interrupted (either automatically or by action by the operator) so as to enable the operator or a mechanized system to remove the most recently deposited pass (that presents the defect that triggered the issuing of the warning message).

The invention claimed is:

1. A method of automatically inspecting a weld bead deposited in a plurality of passes (P) in a chamfer formed between two metal parts for assembling together, the various passes of the weld bead being deposited by means of welding electrodes moving along the chamfer, the method comprising the following steps:
   positioning at least one emission electromagnetic acoustic sensor (2-T) for emitting ultrasound waves on one side of the chamfer and at least one reception electromagnetic acoustic sensor (2-R) for receiving ultrasound signals on an opposite side of the chamfer, the electromagnetic acoustic sensor for emitting ultrasound waves being configured to emit Rayleigh surface waves;
   while depositing a weld bead pass by means of the welding electrodes, automatically moving the electromagnetic acoustic sensors to follow the movement of the welding electrodes along the chamfer;
   activating the electromagnetic acoustic sensors while they are moving so as to enable the emission electromagnetic acoustic sensor to generate and emit Rayleigh waves towards the weld bead pass that is being deposited, the reception electromagnetic acoustic sensor receiving the ultrasound signals transmitted and/or reflected in said pass;
   reiterating the operation for the entire pass of the weld bead; and
   further comprising, on the electromagnetic acoustic sensor receiving ultrasound signals characteristic of a defect in the pass that is being deposited, causing certain welding parameters to be modified during the pass in order to correct said defect,
   wherein the modification of certain welding parameters during the pass is performed automatically by machine learning classes and examples of welding defects.

2. The method according to claim 1, wherein the modification of certain welding parameters during the pass is performed by an operator.

3. The method according to claim 2, wherein the Rayleigh surface waves generated by the electromagnetic acoustic sensor for emitting ultrasound waves are waves emitted at a frequency lying in the range 200 kHz to 4.5 MHz.

4. The method according to claim 3, wherein the electromagnetic acoustic sensors are maintained permanently in contact with a surface of one of the two parts for assembling together so as to avoid any loss of signal during the inspection.

5. The method according to claim 4, wherein the parts for assembling together are abutting tubular pipes, the chamfer being annular in shape.

6. The method according to claim 5, further comprising, throughout the duration of the inspection, acquiring the angular position of the electromagnetic acoustic sensors relative to the axis of revolution (X-X) of the chamfer in order to determine the circumferential location of any defect in the pass of the weld bead that is being deposited.

7. The method according to claim 6, wherein the angular position of the electromagnetic acoustic sensors is acquired by means of a rotary encoder coupled to a movable carriage carrying the electromagnetic acoustic sensors.

8. The method according to claim 7, wherein the movable carriage carrying the electromagnetic acoustic sensors is connected to a carriage carrying the welding electrodes in order to move together therewith while depositing a weld bead pass.

9. The method according to claim 7, wherein the movable carriage carrying the electromagnetic acoustic sensors moves in a circumferential direction around the axis of revolution of the chamfer along an annular guide strip positioned on one of the tubular pipes.

10. The method according to claim 9, wherein the movable carriage carrying the electromagnetic acoustic sensors moves along the guide strip by means of an electric motor (29; 29'), while being suitable for being held stationary in any angular position.

11. The method according to claim 10, wherein the electromagnetic acoustic sensors comprise an electromagnetic acoustic sensor for receiving ultrasound signals and an electromagnetic acoustic sensor for emitting ultrasound waves positioned on one side of the chamfer, and another electromagnetic acoustic sensor for receiving ultrasound signals positioned on the opposite side of the chamfer.

12. The method according to claim 10, wherein the electromagnetic acoustic sensors comprise an electromagnetic acoustic sensor for receiving ultrasound signals and an electromagnetic acoustic sensor for emitting ultrasound waves positioned on one side of the chamfer, and another electromagnetic acoustic sensor for receiving ultrasound signals and another electromagnetic acoustic sensor for emitting ultrasound waves, both positioned on the opposite side of the chamfer.

13. The method according to claim 1, wherein the steps of the method are repeated for each pass (P) of the weld bead deposited in the chamfer.

14. The method according to claim 13, further comprising, on the electromagnetic acoustic sensor receiving ultrasound signals characteristic of a defect in the pass that is being deposited, automatically issuing a warning signal.

* * * * *